(12) United States Patent
Shaw et al.

(10) Patent No.: US 7,694,064 B2
(45) Date of Patent: Apr. 6, 2010

(54) MULTIPLE CELL COMPUTER SYSTEMS AND METHODS

(75) Inventors: Mark Shaw, Garland, TX (US); Russ William Herrell, Fort Collins, CO (US); Stuart Allen Berke, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 523 days.

(21) Appl. No.: 11/024,575

(22) Filed: Dec. 29, 2004

(65) Prior Publication Data
US 2006/0143357 A1 Jun. 29, 2006

(51) Int. Cl.
*G06F 13/00* (2006.01)

(52) U.S. Cl. .................. 710/317; 710/316; 712/11; 326/41; 709/249

(58) Field of Classification Search .............. 710/317, 710/316, 100, 309; 709/249; 712/11, 15; 326/41, 38, 9, 413
See application file for complete search history.

(56) References Cited

U.S. PATENT DOCUMENTS

| | | | |
|---|---|---|---|
| 4,644,461 A | 2/1987 | Jennings | |
| 4,811,210 A | 3/1989 | Mcauley | |
| 4,930,102 A | 5/1990 | Jennings | |
| 5,081,575 A | 1/1992 | Hiller et al. | |
| 5,261,059 A * | 11/1993 | Hedberg et al. | 710/317 |
| 5,313,590 A * | 5/1994 | Taylor | 710/317 |
| 5,345,556 A * | 9/1994 | Zapisek | 709/244 |
| 5,388,099 A * | 2/1995 | Poole | 370/380 |
| 5,392,446 A | 2/1995 | Tower et al. | |
| 5,408,606 A | 4/1995 | Eckart et al. | |
| 5,410,649 A | 4/1995 | Gove et al. | |
| 5,471,580 A * | 11/1995 | Fujiwara et al. | 709/249 |
| 5,574,847 A | 11/1996 | Eckart et al. | |
| 5,577,204 A | 11/1996 | Brewer et al. | |
| 5,592,610 A * | 1/1997 | Chittor | 714/4 |
| 5,682,479 A * | 10/1997 | Newhall et al. | 709/242 |
| 5,826,049 A | 10/1998 | Ogata et al. | |
| 5,842,034 A * | 11/1998 | Bolstad et al. | 712/11 |
| 5,859,975 A | 1/1999 | Brewer et al. | |
| 5,887,146 A | 3/1999 | Baxter et al. | |
| 5,890,007 A | 3/1999 | Zinguuzi | |

(Continued)

FOREIGN PATENT DOCUMENTS

EP 1284459 A 2/2003

OTHER PUBLICATIONS

Joshi et al. Silicon-Photonic Clos Networks for Global On-Chip Communication. Proceedings of the 3rd International Symposium on Networks-on-Chip (NOCS-3). May 2009.*

(Continued)

*Primary Examiner*—Mark Rinehart
*Assistant Examiner*—Matthew D Spittle

(57) ABSTRACT

In an embodiment, a multi-processor computer system includes multiple cells, where a cell may include one or more processors and memory resources. The system may further include a global crossbar network and multiple cell-to-global-crossbar connectors, to connect the multiple cells with the global crossbar network. In an embodiment, the system further includes at least one cell-to-cell connector, to directly connect at least one pair of the multiple cells. In another embodiment, the system further includes one or more local crossbar networks, multiple cell-to-local-crossbar connectors, and local input/output backplanes connected to the one or more local crossbar networks.

12 Claims, 5 Drawing Sheets

U.S. PATENT DOCUMENTS

| | | | |
|---|---|---|---|
| 5,930,822 A | 7/1999 | Chaney et al. | |
| 6,055,599 A | 4/2000 | Han et al. | |
| 6,072,772 A | 6/2000 | Charny et al. | |
| 6,072,806 A * | 6/2000 | Khouri et al. | 370/465 |
| 6,125,429 A | 9/2000 | Goodwin et al. | |
| 6,184,713 B1 * | 2/2001 | Agrawal et al. | 326/41 |
| 6,263,415 B1 * | 7/2001 | Venkitakrishnan | 712/11 |
| 6,282,583 B1 | 8/2001 | Pincus et al. | |
| 6,348,813 B1 * | 2/2002 | Agrawal et al. | 326/41 |
| 6,353,876 B1 | 3/2002 | Goodwin et al. | |
| 6,378,029 B1 | 4/2002 | Venkitakrishnan et al. | |
| 6,597,692 B1 | 7/2003 | Venkitakrishnan | |
| 6,604,230 B1 | 8/2003 | Khalid et al. | |
| 6,618,825 B1 | 9/2003 | Shaw | |
| 6,633,580 B1 | 10/2003 | Torudbakken et al. | |
| 6,633,945 B1 * | 10/2003 | Fu et al. | 710/316 |
| 6,650,142 B1 * | 11/2003 | Agrawal et al. | 326/41 |
| 6,715,023 B1 | 3/2004 | Abu-Lebdeh et al. | |
| 6,721,313 B1 | 4/2004 | Van Duyne | |
| 6,760,870 B1 * | 7/2004 | Snyder et al. | 714/712 |
| 6,925,547 B2 * | 8/2005 | Scott et al. | 711/207 |
| 6,971,044 B2 * | 11/2005 | Geng et al. | 714/11 |
| 2001/0021187 A1 | 9/2001 | Saeki et al. | |
| 2003/0131200 A1 | 7/2003 | Berg et al. | |
| 2004/0088522 A1 | 5/2004 | Watson | |
| 2006/0095557 A1 * | 5/2006 | Lesartre et al. | 709/224 |

OTHER PUBLICATIONS

Heer et al. Self-Routing Crossbar Switch with Internal Contention Resolution. IEEE. 2001.*
Gratz et al. Implementation and Evaluation of On-Chip Network Architectures. IEEE. 2006.*
International Search Report for PCT/US2005/046524 dated May 18, 2006.

* cited by examiner

MULTIPLE CELL COMPUTER SYSTEMS AND METHODS

BACKGROUND

A multi-processor computer system includes multiple central processing units (CPUs) and memory resources. Some traditional architectures interconnect some or all of these system components through one or more shared busses. Because the busses are shared, communication between any two system components is limited by the bus bandwidth. Further, system components must communicate over a bus according to the system's bus contention rules, in order to avoid data collisions on the bus. The inherent latencies in bus-based systems limit their performance.

Other architectures interconnect CPUs and memory resources through crossbar switches. A crossbar switch is a circuit which may connect CPUs to each other and to various memory resources. A CPU may attach at any time to another CPU or to a memory resource through one or more crossbar switches, without contending for the connection. This type of architecture may be faster than a bus-based system, because each CPU and memory resource essentially has a "hard link" between them. Accordingly, contention issues are eliminated, and the system performance may be increased.

Like all types of circuits, crossbar circuits have limited connectivity. Accordingly, a single crossbar circuit may provide connections to a limited number of CPUs and memory resources. Accordingly, systems that include larger numbers of CPUs and memory resources may include multiple crossbar circuits. In such systems, an interconnection between a particular CPU and a particular memory resource may include multiple crossbar switches or "hops." Each hop adds time to data transfers, and accordingly increases latency.

A goal for the interconnect between CPUs and memory resources is to provide sufficient bandwidth so that the interconnect is not the limiting performance factor when executing a program. Due to the memory bandwidth requirements of today's CPUs, this goal is difficult to meet. Therefore, current designs attempt to provide as much bandwidth as possible for the CPU and memory resource interconnect without violating other design constraints (e.g., cost, space, and power).

BRIEF DESCRIPTION OF THE DRAWINGS

Like-reference numbers refer to similar items throughout the figures and.

DETAILED DESCRIPTION

Figure 1:
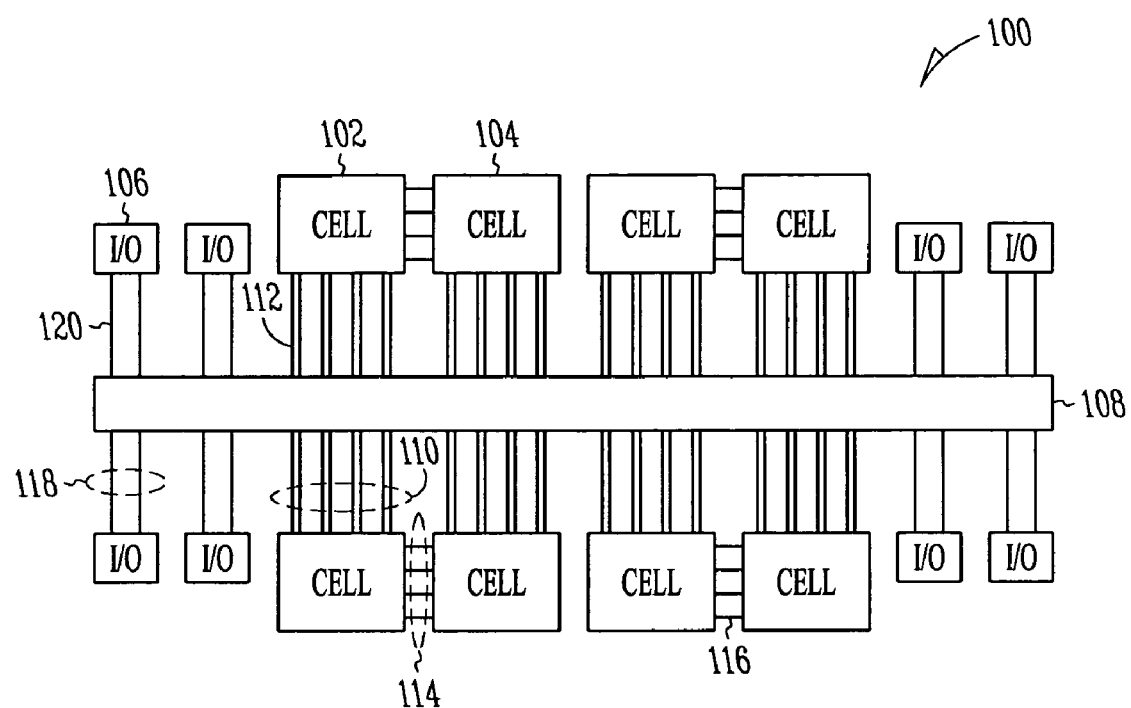
FIG. 1 is a simplified block diagram of a multi-processor computer system, in accordance with an example embodiment.

FIG. 1 is a simplified block diagram of a multi-processor computer system 100, in accordance with an example embodiment. For example, system 100 may form a portion of a shared multi-processor (SMP) computer system. System 100 has a "cell-based" architecture, which includes multiple cells 102, 104, and multiple I/O backplanes 106, and at least one crossbar network 108. Although eight cells 102, 104 and eight I/O backplanes 106 are illustrated in FIG. 1, more or fewer cells 102, 104 and/or I/O backplanes 106 may be included, in other embodiments.

Crossbar network 108 may include one or more crossbar integrated circuits (ICs), which provide for interconnectivity between cells 102, 104 and I/O backplanes 106. In an embodiment, crossbar network 108 includes four crossbar ICs, although crossbar network 108 may include more or fewer crossbar ICs, in other embodiments. Crossbar ICs may be packaged in the same IC package or in different IC packages.

One or more crossbar ICs may be included on a crossbar board, and each crossbar board is connectable to a "mid-plane" (not illustrated). In an embodiment, the mid-plane includes one or more wiring harnesses, which may receive and interconnect various types of boards. Although a mid-plane is not illustrated in FIG. 1, it is to be understood that a mid-plane may exist between cells 102, 104, I/O backplanes 106, and crossbar network 108, in various embodiments.

A crossbar IC includes multiple ports, which are connectable to cells 102, 104 and I/O backplanes 106 through the mid-plane. In an embodiment, a crossbar IC includes 20 ports, although a crossbar IC may include more or fewer ports, in other embodiments. In an embodiment, one or more crossbar ICs may be dedicated to data requests, and one or more crossbar ICs may be dedicated to responses. Accordingly, a port may be split into two portions, in an embodiment. In other embodiments, crossbar ICs and/or ports may not be dedicated in this manner.

In an embodiment, a cell 102, 104 is a computational unit, which includes memory resources and one or more general or special-purpose processing elements or processors (e.g., CPUs, application-specific integrated circuits, etc.). Accordingly, a cell 102, 104 includes a means for processing and storing data. In an embodiment, a cell 102, 104 includes two CPUs, although a cell may include more or fewer CPUs, in alternate embodiments. Further, each cell 102, 104 may include a different number of CPUs from other cells. In other words, cells 102, 104 need not be identical, but instead may have various numbers of CPUs and various quantities of memory resources. In an embodiment, each cell is physically located on a cell board, which is connectable to the mid-plane. Various cell board embodiments are described in more detail later, in conjunction with FIG. 3.

Cells 102, 104 are connected to crossbar network 108 through cell-to-crossbar connectors 110. In an embodiment, a cell-to-crossbar connector 110 includes multiple links 112, where two links 112 from a cell 102, 104 connect with each crossbar IC. Accordingly, in an embodiment that includes four crossbar ICs within crossbar network 108, a crossbar connector 110 may include eight links 112. In alternate embodiments, more or fewer links may interconnect each cell 102, 104 with each crossbar IC, and accordingly, a crossbar connector 110 may include more or fewer links 112.

In various embodiments, all or selected ones of links 112 may include any suitable, industry-standard or proprietary high-speed data link capable of implementing the system cache coherency protocol, which can employ any suitable physical signaling layer implementation, including but not limited to multi-lane, high-speed serial (HSS), parallel clock-forwarded, fiber optic or other methods.

In an embodiment, sets of two or more cells 102, 104 also include cell-to-cell connectors 114. Sets of cells 102, 104 having cell-to-cell connections 114 between them are referred to as "buddy cells." In an embodiment, a set of buddy cells includes two cells. In alternate embodiments, a set of buddy cells may include more than two cells.

In an embodiment, a cell-to-cell connector 114 includes multiple links 116 (e.g., high-speed data links, in an embodiment). In an embodiment, at least one link 116 is present for each CPU. Accordingly, in an embodiment that includes two CPUs per cell 102, 104, a cell-to-cell connector 114 may include four links 116. In alternate embodiments, a correlation of links to CPUs may be different than a 1:1 correlation, and accordingly, a cell-to-cell connector 114 may include more or fewer links 116. In other embodiments, at least one link 116 may be present for each agent, in addition to the CPU cell-to-cell links, or alternatively to the CPU cell-to-cell links.

In an embodiment, cell-to-cell connectors 114 provide communications between CPUs located on different buddy cells. In a further or alternative embodiment, cell-to-cell connectors 114 provide communications between a CPU and an agent located on different buddy cells. Accordingly, in embodiments in which CPUs and agents on different cell-boards 102, 104 form a part of a single partition, cell-to-cell connections 114 may facilitate communications between the CPUs and/or agents of that partition, because communication may be possible through cell-to-cell connections 114 at higher speeds than the communication speeds between CPUs and/or agents through crossbar network 108.

I/O backplanes 106 provide communications with computers and networks that are external to system 100. I/O backplanes 106 are connected to crossbar network 108 through I/O-to-crossbar connectors 118. In an embodiment, an I/O-to-crossbar connector 118 includes two links 120 (e.g., high-speed data links, in an embodiment) to crossbar network 108. In alternate embodiments, more or fewer links may interconnect each I/O backplane 106 with crossbar network 108. In an embodiment, each I/O backplane 106 is physically located on an I/O board or chassi, which is connectable to the mid-plane.

In FIG. 1, cells 102, 104 and I/O backplanes 106 are connected to a uniform crossbar network 108. In alternate embodiments, some of which will be described in conjunction with FIG. 2, a system may include multiple crossbar networks.

Figure 2:
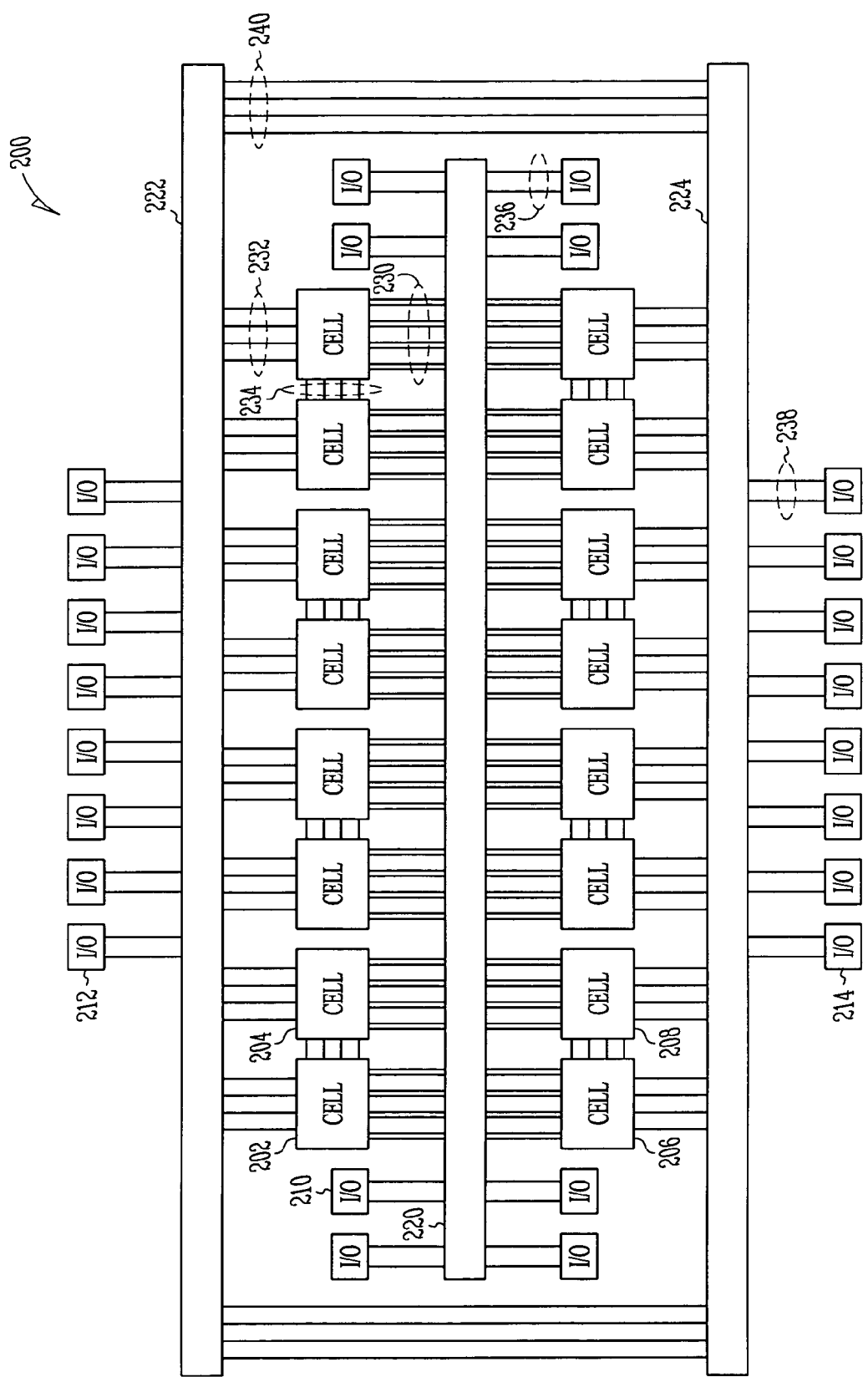
FIG. 2 is a simplified block diagram of a multi-processor computer system, in accordance with another example embodiment.

FIG. 2 is a simplified block diagram of a multi-processor computer system 200, in accordance with another example embodiment. For example, system 200 may form a portion of an SMP computer system. As with the system 100 (FIG. 1) previously described, system 200 has a cell-based architecture, which includes multiple cells 202, 204, 206, 208 and multiple I/O backplanes 210, 212, 214. In addition, in an embodiment, system 200 includes multiple crossbar networks 220, 222, 224. Although sixteen cells 202, 204, 206, 208 and twenty-four I/O backplanes 210, 212, 214 are illustrated in FIG. 2, more or fewer cells 202, 204, 206, 208 and/or 10 backplanes 210, 212, 214 may be included, in other embodiments.

Crossbar network 220 is referred to herein as a "global" crossbar network, and crossbar networks 222, 224 are referred to herein as "local" crossbar networks. Each of crossbar network 220, 222, 224 may include one or more crossbar ICs, which provide for interconnectivity between cells 202, 204, 206, 208 and I/O backplanes 210, 212, 214. In an embodiment, global crossbar network 220 includes four crossbar ICs, and local crossbar networks 222, 224 each include two crossbar ICs, although any or all of crossbar networks 220, 222, 224 may include more or fewer crossbar ICs, in other embodiments.

As with the system described in conjunction with FIG. 1, one or more crossbar ICs may be included on a crossbar board, and each crossbar board is connectable to a "mid-plane" (not illustrated). Although a mid-plane is not illustrated in FIG. 2, it is to be understood that a mid-plane may exist between cells 202, 204, 206, 208, I/O backplanes 210, 212, 214, and crossbar networks 220, 222, 224, in various embodiments.

Cells 202, 204, 206, 208 are connected to global crossbar network 220 through cell-to-global-crossbar connectors 230. In an embodiment, a cell-to-global-crossbar connector 230 includes multiple links (e.g., high-speed data links, in an embodiment), where two links from a cell 202, 204, 206, 208 connect with each crossbar IC. Accordingly, in an embodiment that includes four crossbar ICs within crossbar network 220, a cell-to-global-crossbar connector 230 may include eight links. In alternate embodiments, more or fewer links may interconnect each cell 202, 204, 206, 208 with each crossbar IC, and accordingly, a cell-to-global-crossbar connector 230 may include more or fewer links.

In an embodiment, cells 202, 204, 206, 208 also are connected to local crossbar networks 222, 224 through cell-to-local-crossbar connectors 232. In an embodiment, a cell-to-local-crossbar connector 232 includes multiple links (e.g., high-speed data links, in an embodiment), where two links from a cell 202, 204, 206, 208 connect with each crossbar IC. Accordingly, in an embodiment that includes two crossbar ICs within each local crossbar network 222, 224, a cell-to-local-crossbar connector 232 may include four links. In alternate embodiments, more or fewer links may interconnect each cell 202, 204, 206, 208 with each crossbar IC, and accordingly, a cell-to-local-crossbar connector 232 may include more or fewer links.

Similar to the system described in conjunction with FIG. 1, in an embodiment, sets of two or more cells 202, 204, 206, 208 also include cell-to-cell connectors 234, each of which includes multiple links (e.g., high-speed data links, in an embodiment). In an embodiment, a set of buddy cells (e.g., cells 202 and 204 or cells 206 and 208) includes two cells. In alternate embodiments, a set of buddy cells may include more than two cells.

I/O backplanes 210, 212, 214 provide communications with computers and networks that are external to system 200. In an embodiment, global I/O backplanes 210 are connected to global crossbar network 220 through I/O-to-global-crossbar connectors 236, and local I/O backplanes 212, 214 are connected to local crossbar networks 222, 224 through I/O-to-local-crossbar connectors 238. In an embodiment, an I/O-to-crossbar connector 236, 238 includes two links (e.g., high-speed data links, in an embodiment) to crossbar networks 220, 222, 224. In alternate embodiments, more or fewer links may interconnect each I/O backplane 210, 212, 214 with a crossbar network 220, 222, 224. In an embodiment, each I/O backplane 210, 212, 214 is physically located on an I/O board or chassi, which is connectable to the mid-plane.

In a further embodiment, local crossbar networks 222, 224 are interconnected through one or more local-to-local-crossbar connector 240, which includes multiple links (e.g., high-speed data links, in an embodiment). In an embodiment, two links are associated with each crossbar IC. Accordingly, in an embodiment in which each local crossbar network 222, 224 includes two crossbar ICs, eight links are present within local-to-local crossbar connector 240. In alternate embodiments, more or fewer links may be included.

The architecture illustrated in FIG. 2 has several connectivity characteristics. First, each cell 202, 204, 206, 208 may either communicate directly (logically or physically) over cell-to-cell connectors 234 to a buddy cell, or may communicate through a single crossbar hop through global crossbar network 220. Second, each cell 202, 204, 206, 208 may communicate with any I/O backplane 210, 212, 214 through one, or at most two crossbar hops. For example, cell 202 may communicate with a global I/O backplane 210 via one crossbar hop through global crossbar network 220.

Cell 202 may also communicate with a "close" local I/O backplane 212, which is connected to a common local crossbar network 222, via one crossbar hop. The path between cell 202 and local I/O backplane 212 includes a cell-to-local crossbar connector (e.g., connector 232), local crossbar network 222, and an I/O-to-local-crossbar connector (e.g., connector 238).

Cell 202 may communicate with a "remote" local I/O backplane 214, which is connected to a different local crossbar network 224, via two crossbar hops. In this case, the path between cell 202 and local I/O backplane 214 may include a cell-to-local crossbar connector (e.g., connector 232), local crossbar network 222, a local-to-local crossbar connector (e.g., connector 240), local crossbar network 224, and an I/O-to-local-crossbar connector (e.g., connector 238).

Figure 3:
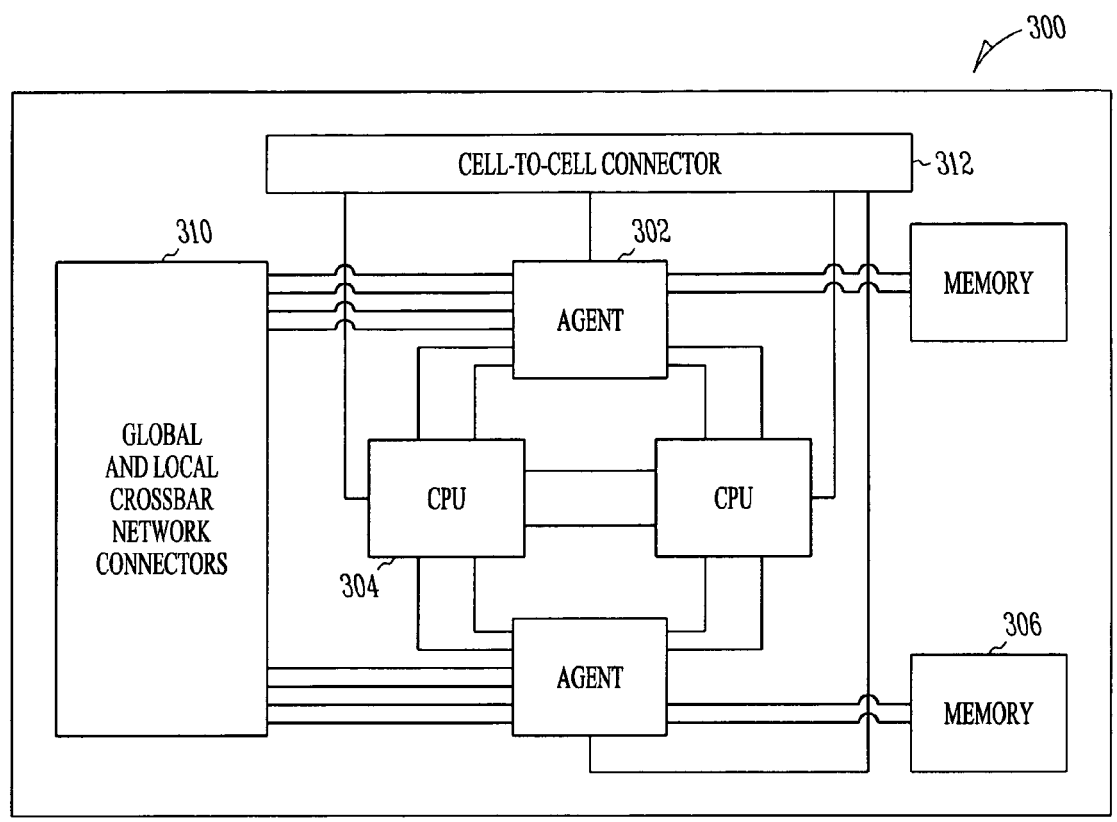
FIG. 3 is a simplified block diagram of a cell, in accordance with an example embodiment.

FIG. 3 is a simplified block diagram of a cell 300, in accordance with an example embodiment. Cell 300 includes one or more agents 302, one or more CPUs 304, and one or more memory resources 306, in an embodiment. Memory resources 306 may include, for example, from one to many volatile or non-volatile memory devices or memory modules, such as random access memory (RAM), read-only memory (ROM) devices, and/or dual in-line memory modules (DIMMs), to name a few.

Although two each of agents 302, CPUs 304, and memory resources 306 are illustrated in FIG. 3, more or fewer of each of these cell elements may be included in alternate embodiments. Cell 300 may further include one or more global and/or local crossbar network connectors 310, which enable cell 300 to be mechanically and electrically attached to a mid-plane (and thus interconnected with one or more crossbar networks).

Agents 302 serve as interfaces between the mid-plane and the cell's CPUs 304 and memory resources 306. Agents 302 receive incoming requests from CPUs 304 or from connectors 310, and take action accordingly. For example, when an agent 302 receives a memory request from a CPU 304, agent 302 interprets the request to determine whether the requested data is located within on-cell memory 306 or on in another cell. For off-cell requests, an agent 302 may translate the request, and send it out to a global or local crossbar network via a connector 310. Agent 302 also may receive the requested data from connector 310, and pass the data to the requesting CPU 304.

An agent 302 also may receive a request, via a crossbar network and connector 310, from another CPU on another cell. In this situation, agent 302 interprets the request, retrieves the requested data from memory resources 306, and sends the data out to a crossbar network via connector 310.

In an embodiment, cell 300 additionally includes one or more cell-to-cell connectors 312. A cell-to-cell connector 312 enables cell 300 to be directly connected to one or more other cells (e.g., a buddy cell). The term "directly connected" is used herein to mean physically directly connected or logically directly connected, or both, and the term "directly connect" means to facilitate physical direct connections or logical direct connections, or both. A cell-to-cell connector 312 may be connectable to a compatible cell-to-cell connector on a buddy cell, or a cell-to-cell connector 312 may be connectable to a mid-plane. This enables CPUs 304 and/or agents 302 on cell 300 to communicate more directly to CPUs and/or agents (not illustrated) on another cell. In an embodiment, CPUs 304 on a cell may communicate directly with each other, and each CPU 304 on a cell may communicate directly with each of the CPUs on a buddy cell and/or with one or more agents on a buddy cell.

Embodiments illustrated in FIGS. 1 and 2 are scalable, in that cells and I/O backplanes may be added to and removed from the systems. In addition, in an embodiment, a multi-processor system includes a means for interconnecting multiple systems.

Figure 4:
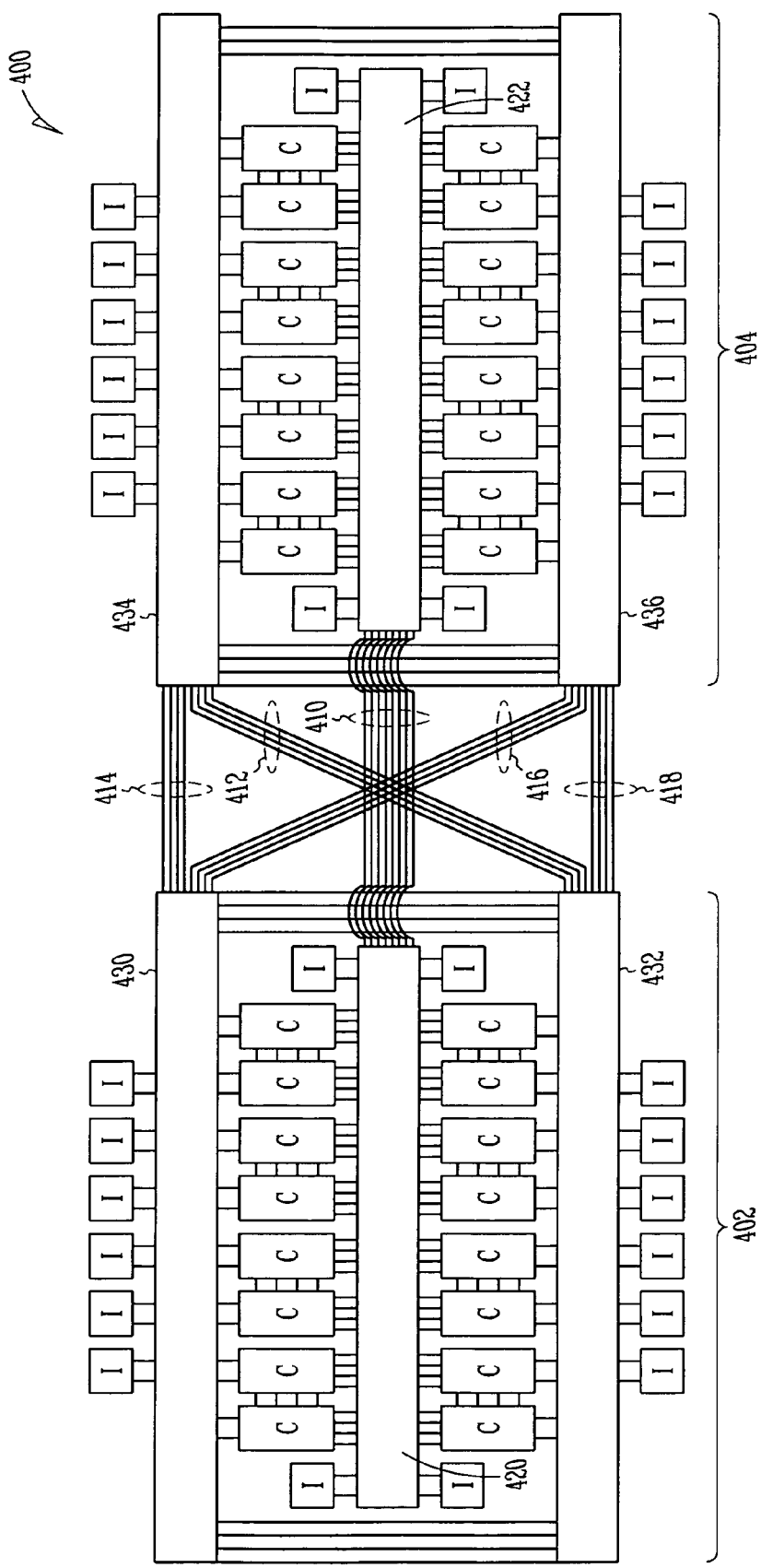
FIG. 4 is a simplified block diagram illustrating two interconnected systems, in accordance with an example embodiment.

FIG. 4 is a simplified block diagram illustrating two interconnected multi-processor systems 402, 404, in accordance with an example embodiment ("C" represents a cell, and "I" represents an I/O backplane). Systems 402, 404 may be located in separate cabinets, for example.

Systems 402, 404 may be interconnected, in an embodiment, by providing global-to-global-crossbar connector 410, and local-to-local-crossbar connectors 412, 414, 416, 418. Connectors 410, 412, 414, 416, 418 may be connected to global crossbar networks 420, 422 and local crossbar networks 430, 432, 434, 436, respectively, through crossbar ports (not illustrated). Accordingly, the crossbar ports and crossbar-to-crossbar connectors 410, 412, 414, 416, 418 provide a means for interconnecting multi-processor systems. Additional systems (not illustrated) may be similarly connected, in various embodiments, to provide further scaling.

Figure 5:
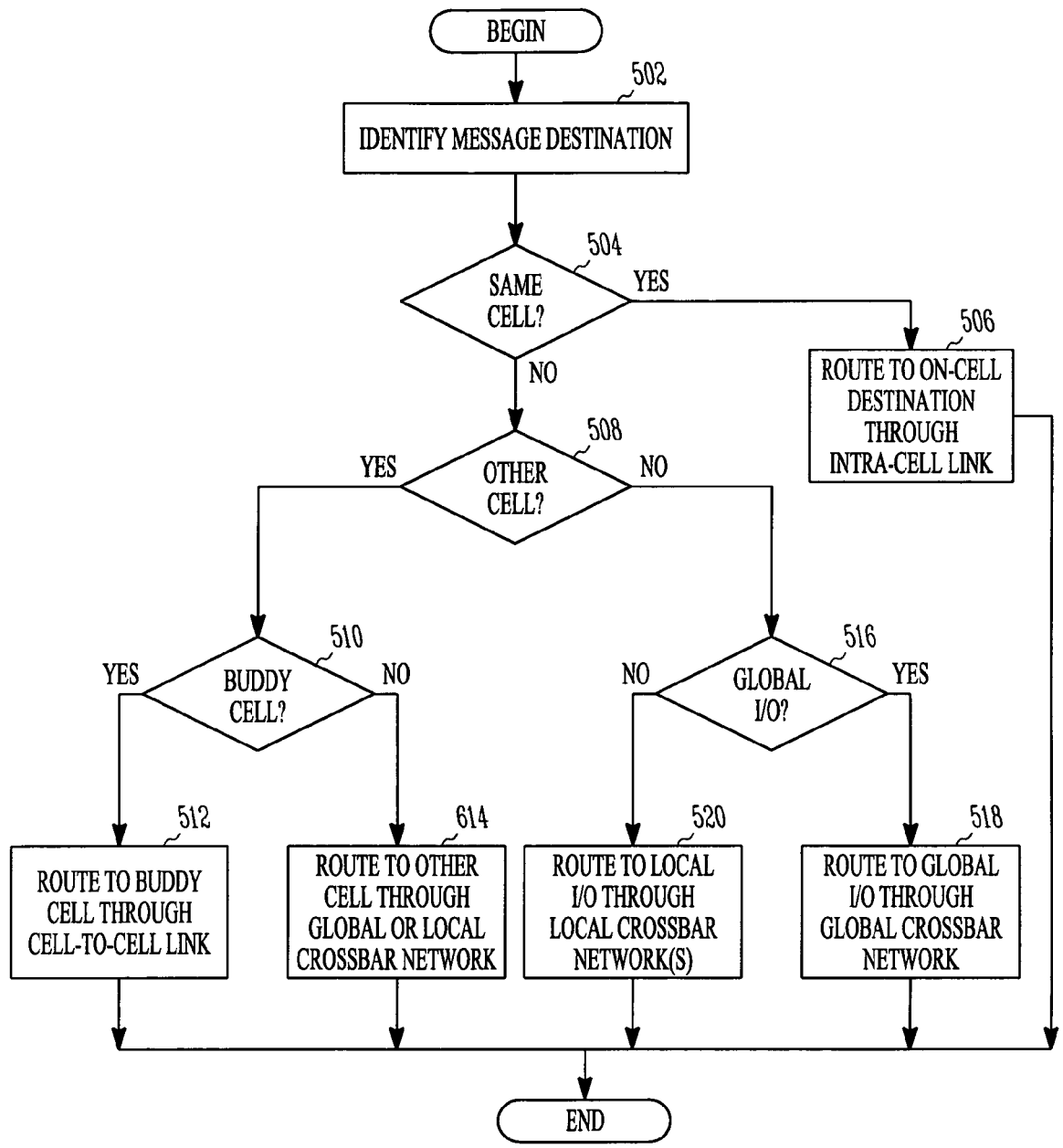
FIG. 5 is a flowchart of a method for routing messages in a multi-processor system, in accordance with an example embodiment.

FIG. 5 is a flowchart of a method for routing messages in a multi-processor system, in accordance with an example embodiment. All or portions of the method may be performed by logic within a cell (e.g., by an agent and/or CPU), in various embodiments.

The method begins, in block 502, by an element of a cell (e.g., a CPU or an agent) identifying a destination of a message. The message may have been generated by the cell element or may have been received by the cell element. For example, a message may include a data request, a response to a data request, an instruction, a command, or another type of message. Message destinations may be, for example, an on-cell CPU, an on-cell memory resource, an off-cell buddy CPU, another off-cell CPU, an off-cell memory resource, a global I/O (i.e., an I/O backplane connected to a global crossbar network), a local I/O (i.e., an I/O backplane connected to a local crossbar network), or an element of a distinct, interconnected system (e.g., a cell or I/O backplane of a system in another cabinet).

A determination is made, in block 504, whether the message destination is within a same cell as the element that is processing the message. If so, then in block 506, information within the message is routed to the destination through an intra-cell link (e.g., a bus or high-speed data link).

If not, then a determination is made, in block 508, whether the message destination is within another cell. If so, then a further determination is made, in block 510, whether the destination cell is a buddy cell (i.e., a cell that is connected through one or more direct, cell-to-cell links (e.g., high-speed data links)). If the destination is located on a buddy cell, then information within the message may be routed to the buddy cell through a cell-to-cell link, in block 512. It would be apparent to one of skill in the art, based on the description herein, that buddy cells may communicate through global and/or local crossbar networks, as well as through direct, cell-to-cell links, in various embodiments.

If the destination is located on another cell, which is not a buddy cell, then the information within the message may be routed to the other cell through a global crossbar network, in block 514, in an embodiment. As previously described, cells also may be interconnected through one or more local crossbar network hops. Accordingly, if the destination is located on another cell, then the information within the message may alternatively be routed to the other cell through one or more local crossbar networks.

Referring again to block 508, if the message destination is not within another cell, then an assumption may be made that the message destination includes an I/O backplane. Accordingly, a determination may be made, in block 516, whether the I/O backplane destination is a global I/O (i.e., an I/O backplane connected to a global crossbar network). If so, then in block 518, the information within the message is routed to the global I/O through the global crossbar network. If not, then an assumption may be made that the message is destined for a local I/O (i.e., an I/O backplane connected to a local crossbar network). Accordingly, in block 520, the information within the message may be routed to the local I/O through one or more local crossbar networks. The method then ends.

The flowchart depicted in FIG. 5 does not address situations in which a message destination may be located within another, interconnected system (e.g., within another cabinet). However, it would be apparent to one of skill in the art, based on the description herein, how to modify the logic of FIG. 5 to include cabinet-to-cabinet transfers over interconnected global and local crossbar networks.

Although FIG. 5 illustrates various processes as occurring in a specific sequence, it would be apparent to one of skill in the art that the order of the process blocks could be modified while still achieving the same results. Accordingly, modifications in the sequence of processing blocks are intended to fall within the scope of the included embodiments.

The various procedures described herein can be implemented in combinations of hardware, firmware, and/or software. Portions implemented in software could use microcode, assembly language code or a higher-level language code. The code may be stored on one or more volatile or non-volatile computer-readable media during execution or at other times. These computer-readable media may include hard disks, removable magnetic disks, removable optical disks, magnetic cartridges or cassettes, flash memory cards, digital video disks, Bernoulli cartridges, RAMs, ROMs, and the like.

Thus, various embodiments of a multi-processor computer system and method of its operation have been described. The various embodiments each may have one or more of the following characteristics. First, embodiments may provide a single crossbar hop latency for CPU-to-memory transfers. Second, embodiments may provide a single crossbar hop latency for CPU to I/O backplane transfers, when the CPU and the I/O backplane are connected to a global crossbar network or to the same local crossbar network. Third, embodiments may provide full connectivity of arbitrary CPU to I/O backplane transfers. Fourth, embodiments include multiple crossbar networks to provide additional bandwidth, and also to provide redundant interconnect paths between cells. Fifth, embodiments include direct cell-to-cell links between buddy cells, to enable high performance in a partitioned system.

The foregoing description of specific embodiments reveals the general nature of the subject matter sufficiently that others can, by applying current knowledge, readily modify and/or adapt it for various applications without departing from the general concept. Therefore, such adaptations and modifications are within the meaning and range of equivalents of the disclosed embodiments. For example, although various system and cell architectures are described in conjunction with the Figures, it would be apparent to those of skill in the art, based on the description herein, that slightly or substantially different architectures may be used in other embodiments.

The phraseology or terminology employed herein is for the purpose of description and not of limitation. Accordingly, the scope of this application embraces all such alternatives, modifications, equivalents and variations as fall within the spirit and broad scope of the appended claims.

What is claimed is:

1. A multi-processor computer system comprising:
   multiple first sets of buddy cells, wherein a cell of the multiple cells includes one or more processors and memory resources;
   a first global crossbar network;
   each cell of the first sets of buddy cells having multiple cell-to-global-crossbar connectors, to connect the multiple cells with the first global crossbar network;
   at least one cell-to-cell connector between buddy cells, to directly connect the buddy cells to each other;
   a first subset of the first set of multiple buddy cells being connected to a first local crossbar network;
   a first plurality of input/output devices coupled to the first local crossbar network;
   a second subset of the first set of multiple buddy cells being connected to a second local crossbar network; and
   a second plurality of input/output devices coupled to the second local crossbar network.

2. The multi-processor computer system of claim 1, further comprising:
   a first plurality of connectors to connect the first local crossbar network to the second local crossbar network.

3. The multi-processor computer system of claim 1, further comprising:
   multiple second sets of buddy cells, wherein a cell of the multiple cells includes one or more processors and memory resources;
   each cell of the second sets of buddy cells having multiple cell-to-global-crossbar connectors, to connect the multiple cells with the second global crossbar network;
   at least one cell-to-cell connector between buddy cells, to directly connect the buddy cells to each other;
   a third subset of the second set of multiple buddy cells being connected to a third local crossbar network;
   a third plurality of input/output devices coupled to the third local crossbar network;
   a fourth subset of the second set of multiple buddy cells being connected to a fourth local crossbar network; and
   a fourth plurality of input/output devices coupled to the fourth local crossbar network.

4. The multi-processor computer system of claim 3, further comprising:
   a plurality of connectors to connect the first, second, third and fourth local crossbar networks to each other; and
   a plurality of connectors to connect the first and second global crossbar networks to each other.

5. The multi-processor computer system of claim 1, wherein the at least one cell-to-cell connector comprises:
   at least one high-speed data link.

6. The multi-processor computer system of claim 1, wherein the at least one cell-to-cell connector enables a central processing unit on a first cell of a pair of buddy cells to directly communicate with a central processing unit on a second cell of the pair of cells.

7. The multi-processor computer system of claim 1, wherein the at least one cell-to-cell connector enables a central processing unit on a first cell of a pair of buddy cells to directly communicate with an agent on a second cell of the pair of cells.

8. A multi-processor computer system comprising:
multiple first sets of buddy cells, wherein each cell of the multiple cells includes one or more processors and memory resources;
a first global crossbar network;
multiple cell-to-global-crossbar connectors, to connect the multiple cells of the first sets of buddy cells with the first global crossbar network;
a first subset of the first set of multiple buddy cells being connected to a first local crossbar network;
each cell of the first subset of the first set having multiple first cell-to-local-crossbar connectors to connect a first subset of the multiple cells with the first local crossbar network;
a second subset of the first set of multiple buddy cells being connected to a second local crossbar network;
a first set of local input/output backplanes connected to the first local crossbar network;
a second set of local input/output backplanes connected to the second local crossbar network;
each cell of the first subset of the first and second subsets having multiple cell-to-local-crossbar connectors to connect the cells with respective first and second local crossbar networks.

9. The multi-processor computer system of claim 8, wherein the multiple cell-to-global-crossbar connectors comprise:
at least one high-speed data link.

10. The multi-processor computer system of claim 8, wherein the multiple first cell-to-local-crossbar connectors comprise:
at least one high-speed data link.

11. A multi-processor computer system comprising:
multiple sets of cells, wherein selected ones of the multiple cells include one or more processors and memory resources;
multiple global crossbar networks;
each cell having multiple cell-to-global-crossbar connectors, to connect different sets of cells with different global crossbar networks;
at least one cell-to-cell connector, to directly connect at least one pair of the multiple cells;
multiple first local crossbar networks corresponding to subsets of sets of cells;
multiple cell-to-local-crossbar connectors to connect a first subset of the multiple cells with first local crossbar networks;
multiple first sets of local input/output backplanes connected to the first local crossbar networks;
multiple second local crossbar networks;
multiple cell-to-local-crossbar connectors to connect a second subset of the multiple cells with the second local crossbar networks;
multiple second sets of local input/output backplanes connected to the second local crossbar networks; and
a local-to-local crossbar connector, to connect selected first local crossbar network and the second local crossbar network and multiple global-to-global crossbar connectors to connect the global crossbar connectors.

12. A cell of a multi-processor computer system, comprising:
two or more processors;
two or more agents;
memory resources;
multiple first crossbar connectors, to enable a connection between the cell and a global crossbar network;
a second crossbar connector, to enable a connection between the cell and a local crossbar network;
a cell-to-cell connector, to enable a cell-to-cell connection between the cell and one or more other cells and
an agent that routes communications via local crossbar connections, local to local crossbar connections, global crossbar connections, global to global crossbar connections, and cell-to-cell connectors.

* * * * *